Oct. 20, 1953  T. C. POULTER  2,656,003
HIGH EXPLOSIVE DISK-SHAPED CHARGE
FOR SEISMIC EXPLORATION
Filed Feb. 27, 1948  5 Sheets-Sheet 1
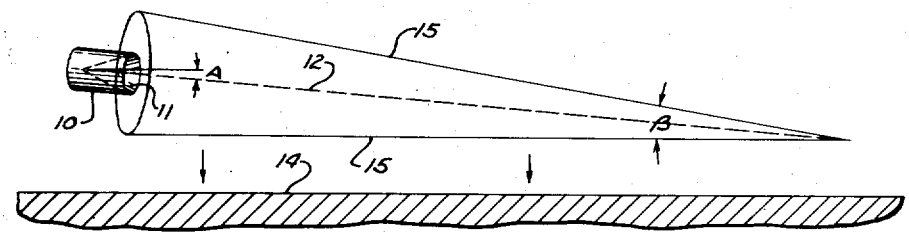
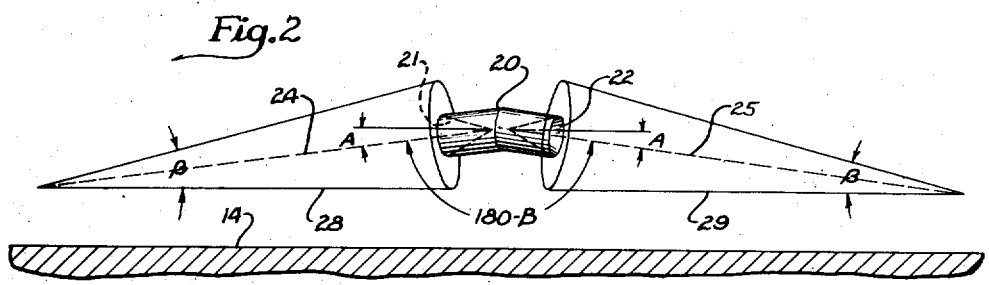
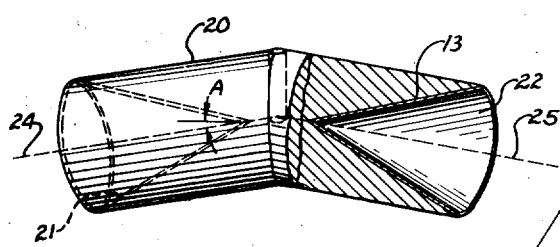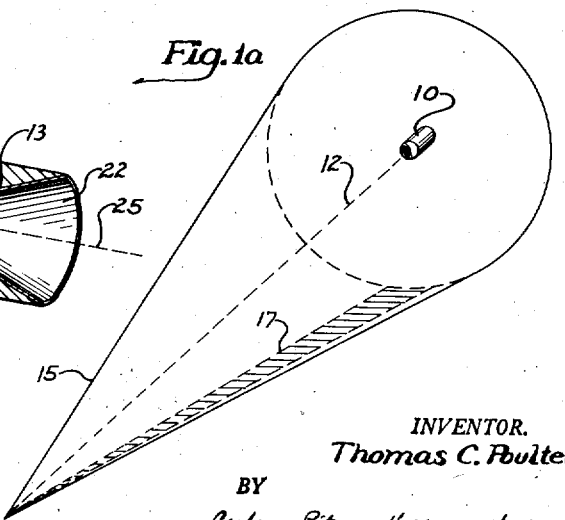
INVENTOR.
Thomas C. Poulter
BY
Carlson Pitzner Hubbard & Hoefe
Attys.

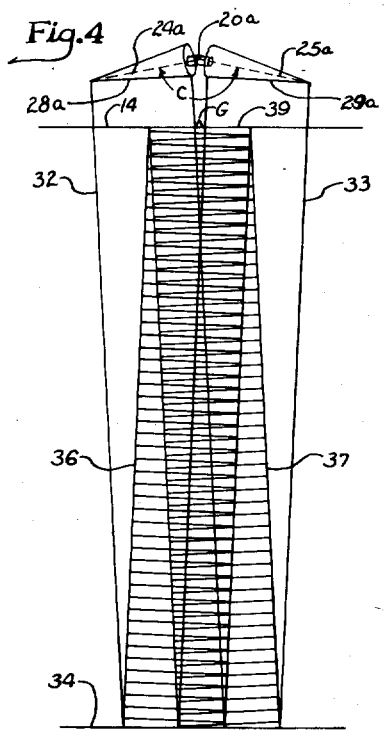
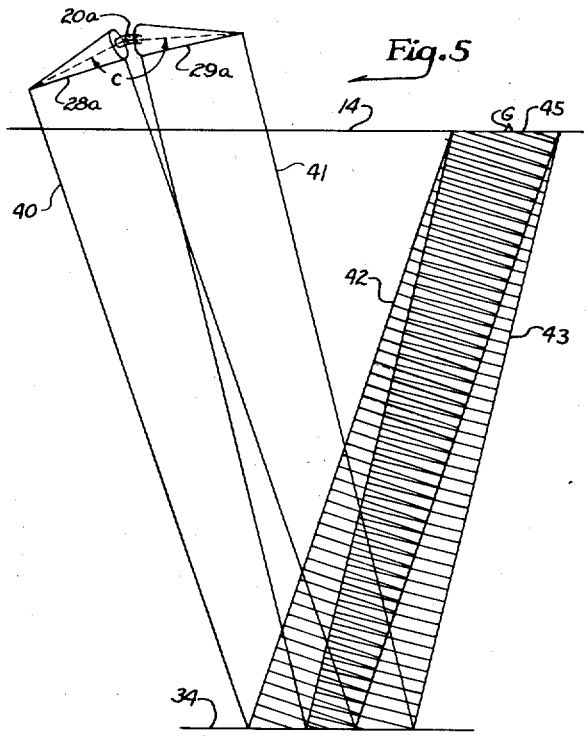
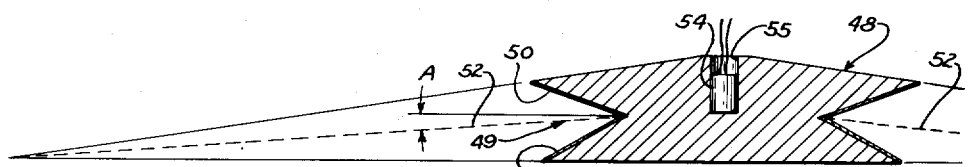
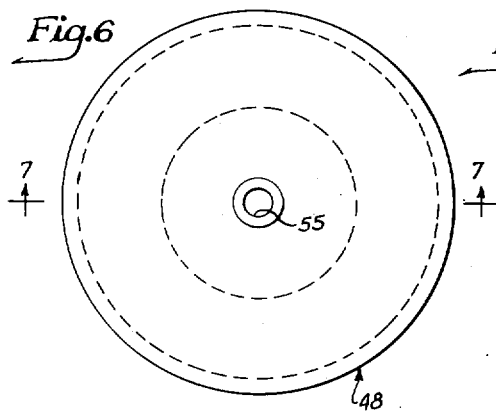
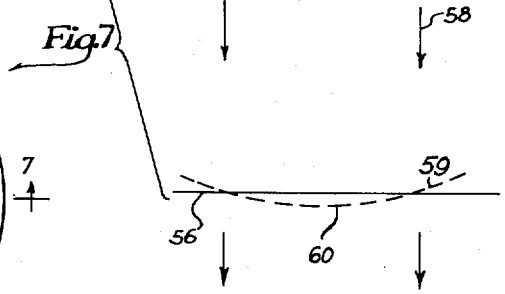

Oct. 20, 1953     T. C. POULTER     2,656,003
HIGH EXPLOSIVE DISK-SHAPED CHARGE
FOR SEISMIC EXPLORATION
Filed Feb. 27, 1948     5 Sheets-Sheet 3
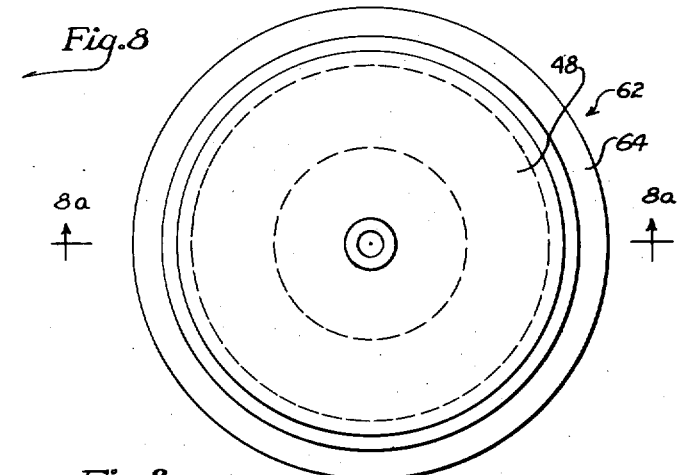
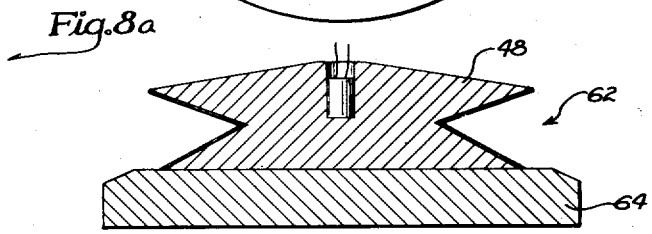
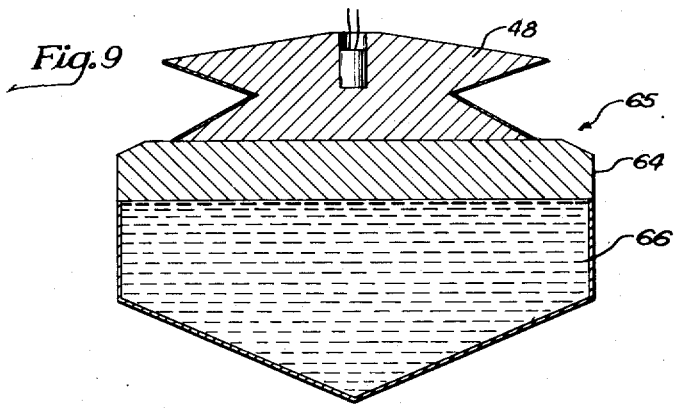
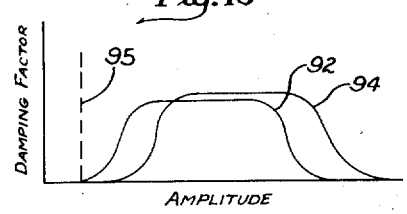
INVENTOR.
*Thomas C. Poulter*
BY
*Carlson Pitzner Hubbard & Holfe*
*attys.*

Oct. 20, 1953
T. C. POULTER
2,656,003
HIGH EXPLOSIVE DISK-SHAPED CHARGE FOR SEISMIC EXPLORATION
Filed Feb. 27, 1948
5 Sheets-Sheet 4
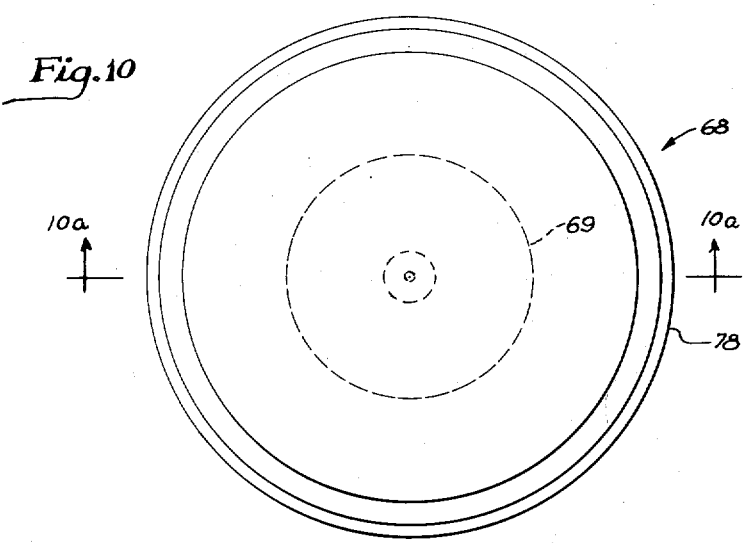
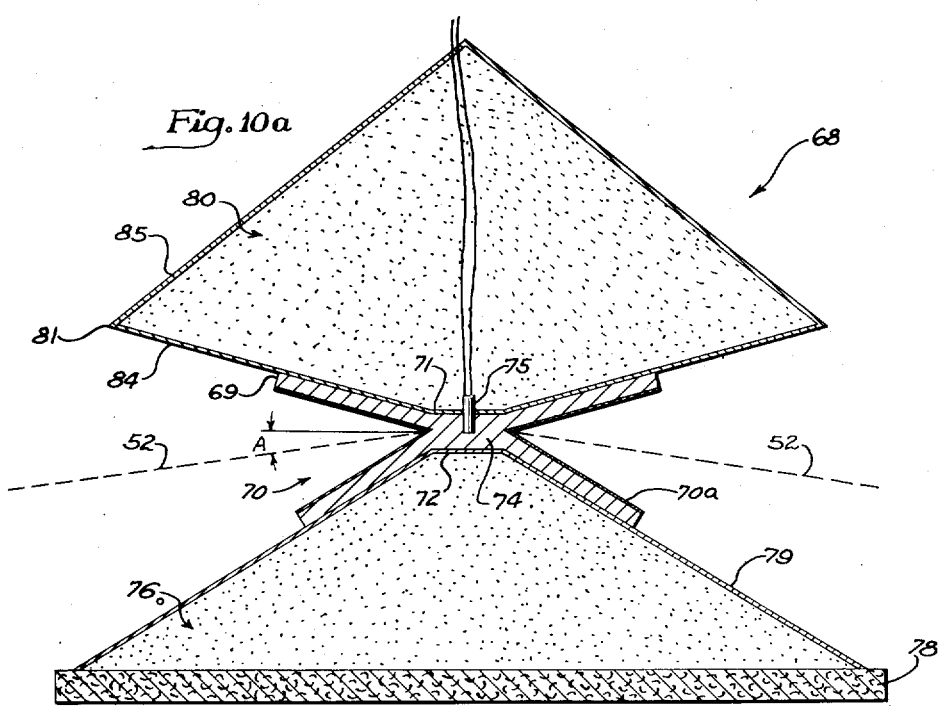
INVENTOR.
Thomas C. Poulter
BY
Carlson Pitzner Hubbard & Wolfe
Attys.

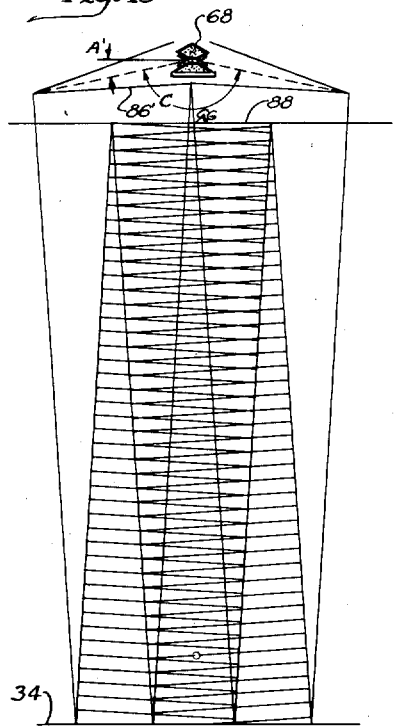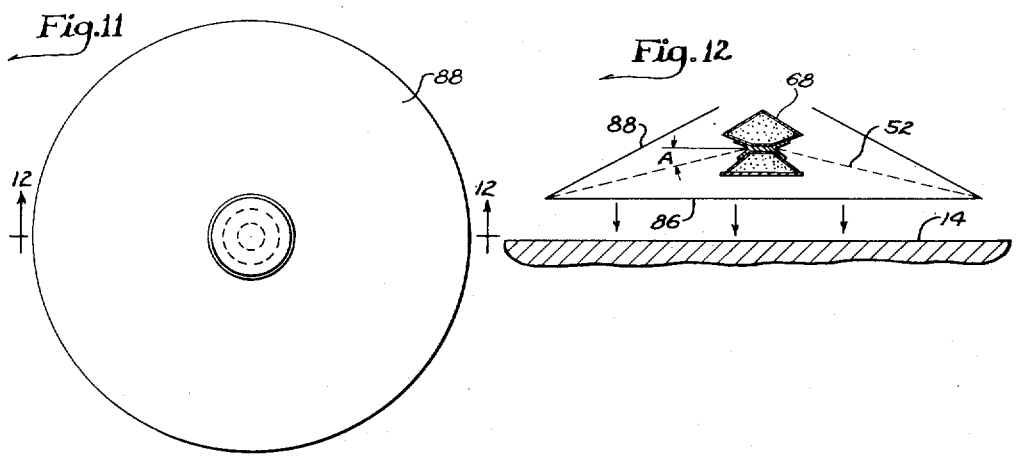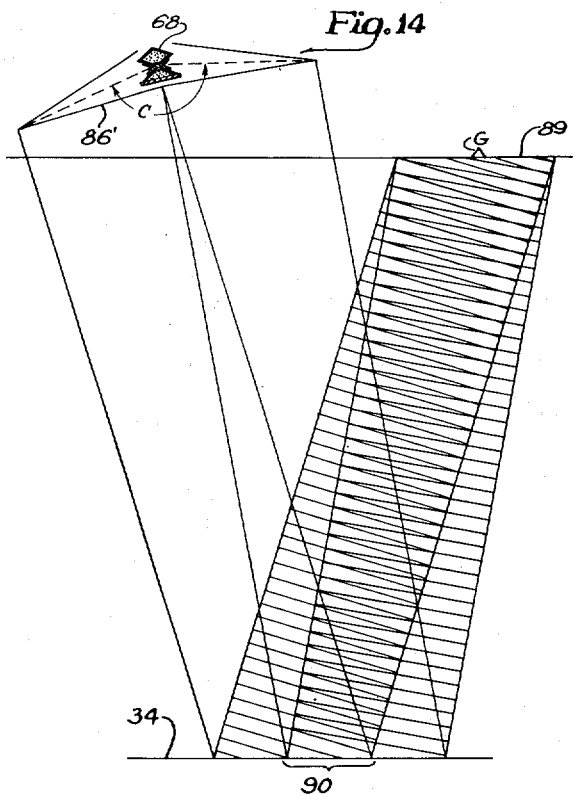

Patented Oct. 20, 1953

2,656,003

UNITED STATES PATENT OFFICE 2,656,003

HIGH EXPLOSIVE DISK-SHAPED CHARGE
FOR SEISMIC EXPLORATION

Thomas C. Poulter, La Grange, Ill., assignor, by
mesne assignments, to Institute of Inventive
Research, San Antonio, Tex., a trust estate Application February 27, 1948, Serial No. 11,613

6 Claims. (Cl. 181—.5)

The present invention relates to geophysical exploration and more particularly to the formation of an improved wave front for obtaining seismic reflections from submerged horizons.

It is an object of the present invention to produce an improved wave front preferably in the form of a shock wave which acts simultaneously over a large area of the earth's surface and which has pronounced directive properties. It is a related object to provide a method of utilizing a shaped explosive charge which enables the explosive energy to be more effectively utilized thereby permitting penetration to deeply submerged layers with minimum attenuation. The charge may accordingly be made much smaller than conventional charges and hence less expensive to manufacture and handle.

It is also an object of the present invention to provide an extended shock wave front and manner of using the same in which the predominating frequency thereof is considerably higher than that obtained by conventional methods enabling impulses received from closely spaced layers or strata to be separated in spite of the inherent limitations of modern day geophone circuits and equipment. Furthermore, it is an object to produce a relatively flat high-frequency shock wave in which the energy is maximum at the center, gradually decreasing toward the periphery thereof.

It is another object of the present invention to provide a charge and procedure for utilizing the same which causes a large portion of the explosive energy to be converted into an earth-borne seismic wave without alteration of or damage to the earth's surface. Employing the present teachings eliminates the necessity for drilling holes for placement of charges and enables any number of charges to be fired in quick succession at a single station. Since the character of the earth is not varied with each blast, obtaining a succession of identical or confirmatory traces is possible. Also, due to the decreased labor required for each setup and the reduction in the time required for placement of successive charges, the cost per oscillograph record may be reduced to a minimum.

It is a further object, allied with the above, to provide an improved charge and method of using the same which may be employed not only to generate a flat, substantially unidirectional wave front in the earth but which may be readily adapted to produce a converging or focussed wave front, causing the explosive energy to be concentrated into a more clearly defined beam, thereby overcoming the tendency of the energy of the wave front to be spread or dissipated. The converging effect may also be advantageously employed to increase the directivity of the wave front enabling it to be aimed in such manner as to reflect directly into the region occupied by one or more geophones. By employing the present teachings, traces obtained under difficult field conditions may be easily and quickly interpreted.

It is still another object to provide an improved charge assembly which is constructed in such a manner as to minimize the direct spherical blast effect and to concentrate the explosive energy into jet form which may be readily utilized to produce a well defined shock wave front for conversion to a seismic wave for propagation in the direction of a reflecting horizon or in the direction of a desired refraction path.

It is a more detailed object to provide an improved explosive charge which is well adapted for obtaining reflections from horizons submerged under water without endangering the fish and other animal life or plant life in the water. In addition, it is desired to produce a charge particularly well adapted for propagating a seismic impulse through snow, loose earth, sand or other low density surface media difficult to penetrate by ordinary means.

Other objects and advantages of the invention will become apparent as the discussion proceeds taken in connection with the accompanying drawings, in which:

Figure 1 shows a shaped charge as utilized in accordance with the present invention together with an outline of the resulting wave front.

Fig. 1a is an oblique view showing the wave front of Fig. 1 as it strikes the earth with the apex of the cone toward the viewer.

Fig. 2 shows a double-ended shaped charge, the shaped portions of which cooperate to produce a single extended wave front.

Fig. 3 is a view in partial section of an explosive charge utilized in the production of the wave front disclosed in Fig. 2.

Fig. 4 discloses the use of a shaped charge of the general type set forth in Fig. 3 but modified to produce a converging or focussed wave front.

Fig. 5 is a view similar to Fig. 4 but showing the focussing of the explosive energy toward a remotely located geophone.

Fig. 6 shows a top view of a shaped charge constructed in accordance with one aspect of the present invention.

Fig. 7 is a section taken along the line 7—7 of Fig. 6 and showing, in addition, the central portion of the resulting wave front.

Figs. 8 and 8a are views showing a charge of the same general type as in the preceding two figures but including a shield plate.

Fig. 9 is similar to Fig. 8 but incorporates modified shielding on the undersurface of the charge assembly.

Fig. 10 is a plan view of a charge assembly utilizing the present invention and in a preferred form.

Fig. 10a is a transverse sectional view taken along the line 10a—10a of Fig. 10.

Fig. 11 shows a plan view of the fan-shaped jet produced by the explosive charge of Figs. 10, 10a.

Fig. 12 is a view in elevation of the charge and resulting wave front taken along the line 12—12 of Fig. 11.

Fig. 13 illustrates the focussing effect which may be obtained by the use of charge assemblies of the type disclosed in Figs. 10, 10a.

Fig. 14 shows the focussing of the explosive energy toward a point remote from the shot point.

Fig. 15 shows variation of damping with amplitude of two sizes of particles.

While the invention is susceptible of various modifications and alternative constructions and uses, I have shown in the drawings and will herein described in detail one embodiment of the invention. It is to be understood, however, that I do not intend to limit the invention by such disclosure, but aim to cover all modifications and alternative constructions and uses falling within the spirit and scope of the invention as expressed in the appended claims.

In geophysical exploration and particularly in prospecting for oil it is necessary to locate domes and other significant strata quickly and with reasonable accuracy even when such structures exist at great depth. It has been proposed to direct explosive energy by particular arrangement of charges in order to increase the magnitude of the reflected wave. Such arrangements have for the most part involved distributing the charges in accordance with a predetermined pattern and then firing such charges either simultaneously or in exact timed sequence. Due to the difficulty of setup and the expense, both of labor and of the charges themselves, relatively little use has been made of the various schemes for concentrating explosive energy.

By way of introduction to the present invention, shaped charges are oriented and exploded at the shot point to produce one or more jets, the direction of which is generally parallel to the surface of the earth. It will be found that under such circumstances, particularly when using unobstructed jets of high velocity and long range, a shock wave front will proceed in a direction almost perpendicular to the direction of the jets. By exploding a charge of the type herein disclosed and well above the earth's surface, the wave front propagated through the earth may be substantially plane over a large area. The shape of the wave front, the extent of the area acted upon, the energy level employed and various additional factors cause the weathered surface layer as well as the deeper substrata to be readily penetrated. In addition to the improved penetration, the frequency characteristics are such as to enable a positive, easily interpreted trace to be obtained.

In accordance with another aspect of the invention an improved charge is disclosed as part of a novel charge assembly which causes concentration of the energy of the jet and minimizes the direct blast effect from the explosive. By applying the present teachings the resulting seismic wave front may be converged or focussed in an improved manner to guide the energy to a pickup point.

Referring now to Figure 1 there will be seen a shaped charge 10 having a conical depression or cavity 11 formed in one end thereof. This cavity is of the Munroe type and the included angle of the cone is preferably about 45 degrees. Explosion of the charge 10 by a suitable detonator causes a jet 12 to proceed at a high velocity outwardly from the explosive and along the axis of the conical depression. By using TNT or, if desired, explosives more brisant and containing a greater amount of energy than TNT, velocities up to thirty or forty times as great as the velocity of sound may be readily obtained. Charges of explosives known in the art as RDX and C-3 have been found to be particularly suitable, producing jets having a velocity of 40,000 feet per second or greater. Preferably the cone is lined with a layer of metal as at 13 to intensify the shock wave set up by the jet. It will be understood that a lining of sheet metal or other weighty material is applicable to all the charges disclosed herein, and it will not be necessary therefore to make specific mention of the lining where such charges are discussed in detail.

In the practice of the invention the shaped charge 10 is so oriented that the jet 12 produced thereby is generally parallel to the surface of the ground indicated at 14 and is unobstructed. The charge is preferably elevated above the ground by a distance of 5 or 6 feet. Greater elevations than this, say, up to 10 or 15 feet, may be employed if desired and the range of elevation may be referred to as "pole height." In any event, the charge should be sufficiently close to the surface of the ground so that the wave striking the ground from the charge is still of supersonic velocity at the time of the impact. When impact occurs the supersonic wave is converted to a seismic or earth-borne wave which proceeds downwardly toward a reflecting horizon, and is picked up by geophone equipment of the conventional type at a receiving station (not shown).

Efforts have been made in the past to employ charges of the Munroe type in seismic prospecting, and many charges have been fired in an endeavor to produce useful reflections. As far as I am aware, however, such charges have been usually fired with the cavity pointed directly downward in the surface of the ground so that the jet produced by the cavity strikes the ground forcefully under the charge. Large charges have been employed in this manner in an effort to get energy into the ground by "brute force." I am informed that such arrangements have produced such poor results that the Munroe charge has not been usefully employed for seismic purposes, the background noise associated with the crushing of earth structure being particularly objectionable. By way of contrast, the present invention requires that the charges be exploded so that the jet proceeds generally parallel to the ground, which might appear to expend the energy of the charges uselessly. My investigations, however, have shown that such is not the case, and that clear and usable seismic records are obtained with the charges positioned as shown in the drawings. It is believed that the improved results are traceable to the fact that the jet from a Munroe charge sets up a wave of supersonic velocity which proceeds more or less at right angles to the direction of the jet. As shown in Fig. 1, the supersonic or shock wave set up by a single pencil-like jet is sharply conical in form and spreads outwardly from the jet in the direction indicated. It is believed that the setting up of the supersonic wave 15 may be more easily understood by drawing an analogy between such wave and the V-shaped "bow wave" set up by a ship as it proceeds at high speed through the water. In the present case the focal point of the disturbance is the forward end of the jet advancing at high speed. The term bow wave may thus be applied to the wave 15 which proceeds flatly toward the surface of the ground.

With the charge fired 5 or 6 feet or more above the ground, it will be apparent that the shock wave front will be of relatively large diameter by the time that such wave front strikes the ground. Further in accordance with the invention, the charge is angled downwardly by a small angle so that the bow wave proceeding downwardly from the jet, as indicated in Fig. 1, strikes the ground at precisely the same time over a considerable portion of its length. As a result, more than "line" contact is achieved. With the jet angled downwardly as indicated in Fig. 1, the supersonic wave front strikes the ground substantially flatly along a ribbon or strip 17 (Fig. 1a) having an average width of several feet and a length of, say, 200 feet.

Preferably the charge is angled downwardly at a small angle A (Fig. 1) equal to the mach angle so that the lower portion of the shock wave front 15 is almost exactly parallel to the surface of the earth 14. The mach angle, which is one-half the included angle B of the conical shock wave, depends upon the velocity of the resulting jet, being given approximately by the relationship $$\frac{B}{2} = \tan^{-1}\left(\frac{\text{sonic vel.}}{\text{jet vel.}}\right)$$

Using high velocity jets on the order of 40,000 feet per second it will be found that the angle B is quite small, on the order of 5 to 10 degrees. It will be appreciated by one skilled in the art that if the velocity of the jet were infinite, the angle B would be zero and the wave front 15 would be cylindrical rather than conical as shown. In Fig. 1, and in the drawings which follow, the angle B has purposely been made rather large in view of space limitations and to bring out the invention more clearly. As a practical matter charges should be used which give the smallest possible mach angle since this corresponds to a maximum area for the contact strip 17.

Employing the arrangement described above, it is found that a substantial directive effect is achieved. That is to say, the simultaneous application of a supersonic wave to a relatively large area of the ground surface produces a seismic wave which tends to proceed straight down and the spreading or inverse square loss is substantially reduced which not only reduces spurious reflections and background noise, but also enables relatively small charges to be employed for the setting up of the seismic wave.

Turning attention now to Fig. 2 there is illustrated a modified shaped charge 20 having conical cavities 21, 22 formed therein for producing opposed jets 24, 25. With the jets 24, 25 each directly downwardly with respect to the horizon at an angle A equal to the mach angle $$\frac{B}{2}$$

the associated wave fronts 28, 29 are merged and thus lie in the same straight line. It is possible by this means to spread the energy imparted to the ground over twice the area possible with a single jet. While Fig. 3 shows the construction of the shaped charge 20 in detail, it will be appreciated by one skilled in the art that the explosive need not be formed generally tubular in shape, but may be of substantially any shape so long as the axes of the conical cavities 21, 22 are angled downwardly with respect to the horizontal mid-line by an angle of approximately A. It will be apparent from Fig. 2 that the angle between the jets 24, 25 will be less than a straight angle by an amount equal to twice the mach angle. Stated in other words, the angle between the jets 24, 25 will be less than 180 degrees by the amount of the included angle B of the conical wave front.

In accordance with one of the more detailed aspects of the invention, the shaped charge 20 may be so constructed that the angle between the jets 24, 25 instead of being numerically equal to (180—B) is somewhat less than such value. The latter arrangement is disclosed in Figs. 4 and 5 to which reference is next made. Corresponding reference numerals with the subscript a are employed in these figures to indicate portions which are analogous to Fig. 2 previously referred to.

Since the jets 24a, 25a (Fig. 4) form an angle C which is more acute than that illustrated in Fig. 3, the corresponding portions 28a, 29a of the wave front no longer lie in a straight line but are angled toward one another slightly. As a result, the energy from the wave front 28a passes along a path 32 as it progresses downwardly toward a reflecting horizon 34. In a similar fashion the energy from the portion 29a of the wave front proceeds downwardly along a path 33 which also strikes the reflecting horizon overlapping the path 32. After the energy strikes such horizon it is reflected upwardly along paths 36, 37 which merge, striking the surface of the earth 14 in the region 39. Here the signal is picked up by a geophone G. In order to more clearly bring out the convergence of the paths 36, 37 the latter have been shown shaded with the shade lines increasingly merging toward the top of the figure. It will be apparent to one skilled in the art that the concentration of the explosive energy greatly increases the level of the impulse received in the region 39 thus making it possible to receive signals from greater depths than by the use of conventional explosive charges while utilizing a lesser amount of explosive.

Referring now to Fig. 5 it will be seen that the shaped explosive charge 20a is readily adapted for beaming energy to a geophone G located remotely from the shot point. In this figure the paths of the downwardly projected energy have been designated 40, 41, the latter striking the submerged horizon 34 to form reflected energy paths 42, 43 which merge in a region 45 at which the geophone is located. The figure has been simplified so that it does not show the refraction of the wave front which occurs as the wave strikes the earth. The latter may, of course, be compensated for by slightly reducing the amount of tilt with respect to the surface being acted upon.

One of the primary advantages of the convergence shown in Figs. 4 and 5 is that it compensates for spreading or "fringing" of the wave front occurring at the latter travels to deeply submerged horizons. Another reason for converging the wave fronts is that the cones comprising the wave front are not precisely shaped and may be blunted due to the slowing down of the jet toward the end of its travel. For most practical purposes the angle C between the jets may be less than (180—B) by 5 to 10 degrees, which is equivalent to saying that the two portions 28a, 29a of the wave front will be angled toward one another by 5 to 10 degrees. If desired, a number of charges having various stepped values for C may be used in succession and the record having the most clearly defined reflected signal may then be selected.

While the conical wave front disclosed in Figs. 1–5 has been found to produce a reasonably plane intersection with a substantial strip 17 of the earth's surface, it has been observed that the wave front may be more nearly plane by using an explosive charge producing a fan-shaped jet. Such a charge is shown in Figs. 6 and 7 and is designated generally by the numeral 48. The charge is preferably circular or disk-shaped having a V-shaped groove 49 formed in the periphery thereof. In order to explode the charge, a centrally located blasting cap 54 is used which is received in a depression 55. A small booster charge may be used, surrounding the blasting cap, if desired.

In practicing the invention, the opposed walls 50, 51 of the groove are angled so that the fan-shaped jet 52, proceeding outwardly along the surface of symmetry between them, is directed downwardly, umbrella-like from the plane of the charge by an angle A. Somewhat analogously to Fig. 1, the angle A may be chosen so that the shock wave front produced by the jet 52 proceeding downwardly in a lateral direction from the jet strikes the earth flatly over a large area. In order to show the substantially plane wave front produced by the charge 48, the same has been indicated at 56 in Fig. 7, progressing downwardly toward the earth in the direction of the arrows 58.

Although a considerable proportion of the explosive energy derived from the jet 52 appears in the shock wave front 56, it has been found that an additional explosive effect is superimposed thereon. In brief, the explosion of the body portion of the charge produces a direct blast wave front 59 which is generally spherical in shape. The latter travels at a supersonic velocity in the region of the charge and thus may precede the shock wave front. However, since the spherical blast is decelerated toward sonic velocity as the distance from the charge increases, the net effect is distortion of the plane wave, for example, by producing a "bulge" 60 at the central portion thereof. It is also possible at short range for the geophone to register both the plane and spherical wave fronts, the order of receipt depending upon whether the central portion or the periphery of the shock wave is being received. Accordingly, it is desirable to confine attention to the plane wave front 56. While the latter may be taken care of to some extent by interpretation of the geophone record, it is proposed that the spherical wave 59 be minimized or substantially eliminated at the source by providing a novel shield which limits the magnitude of the directly-produced blast energy and converts it to a useful form.

Referring to Figs. 8 and 8a the assembly indicated generally at 62 is seen to consist of a disk-shaped charge 48 having a relatively massive shield 64 thereunder. Such shield may, for example, consist of a circular plate of metal such as steel having a radius somewhat greater than the charge itself and having a thickness of ⅝ inch or more. Tests have shown that the mass of the plate 64 tends to retard the high velocity spherical wave front (such as that shown at 59 in Fig. 7) while having little or no retarding effect on the substantially plane shock wave front produced by the jet 52. The spherical wave front is thus decelerated immediately to sonic velocity substantially destroying its identity as a separate signal. Instead, tests have shown that the spherical wave merges and adds to the jet-produced shock wave greatly increasing the effectiveness of the latter.

More specifically, the energy from the decelerated blast appears to "fill in" the gap between the shock waves. The resulting or composite wave front transmitted to the geophone is thus substantially smooth and continuous. The amount of mass in the shield, as will be apparent to one skilled in the art, may be adjusted so that the merger between the plane shock wave and the direct blast wave is optimum.

Preferably the steel plate is additionally backed by a material capable of absorbing the downwardly directed blast energy. Such additional shielding is shown in Fig. 9 where the explosive assembly indicated generally at 65 also includes a container 66 which is filled with water, sand or the like. Both of these materials have proven to be successful energy absorbers. Sand is weighty while composed of particles so small as not to become a hazard. Water possesses the additional advantage of absorbing the direct blast, in part, by its heat of vaporization. It will be apparent to one skilled in the art that other inert materials having considerable mass and distributed about as shown may be used.

In accordance with one of the aspects of the invention the downward blast effect of the explosive is substantially reduced and the energy more completely concentrated in the explosive jet by means of the modified shaped charge shown in Figs. 10 and 10a. Here the charge assembly 68 will be seen to include a body 69 of high explosive which is preferably disk-shaped and which has a V-shaped annular groove 70 formed in its periphery. The sides of the explosive charge 69 are dished out as at 71, 72 to form generally frusto-conical depressions therein so that most of the charge lies adjacent the walls of the groove 70. The central portion 74 of the charge is thus reduced to a relatively thin web into which the blasting cap 75 may be centrally inserted. The latter insures even detonation at all points on the periphery of the charge.

In carrying out the invention the explosive assembly includes a base portion consisting of a conical shielding body 76 which flares outwardly and extends considerably beyond the charge. Such body is preferably formed of damp sand which may be arranged in the form of a mound on a baseboard 78 of pressed fiber or the like. To keep the mound in its original form it may be included within a light conical container 79 constructed of paper, metal or any other sheet material. Paper is preferred since the fragments thereof are not dangerous as missiles. It has been found that the blast effect is further reduced and the jet 52 intensified by forming the body of sand 76 so that the slope forms a substantial continuation of the lower surface 70a of the groove 70, although some variation in the slope is permissible.

In practicing the invention an upper shield 80 is employed which is generally similar in shape to the lower shield 76. The shield 80 is formed of wet sand and is maintained in the desired shape by a container 81 having a lower conical surface 84. The upper surface 85 may also be conical if desired. This container may be constructed of any desired material, for example, light sheet steel or laminated paper for reasons given above. If desired, a single supporting cone may be used for the upper barrier 80. Under such circumstances a shallow cone 84 is nested within the upper surface of the explosive charge and damp sand piled thereon to form a conical mound of about the proportions shown.

Turning now to Figs. 11 and 12, the general type of wave front produced by the charge assembly 68 may be seen. With the axis of the groove 70 directed downwardly at a slight angle A from the horizontal, the fan-shaped jet 52 which extends around the periphery of the charge will be in the form of a shallow cone producing an extensive shock wave front on each side thereof. On the lower side the shock wave front is substantially plane, and, as shown in Fig. 11, is generally circular in plan view. The upper shock wave front 88 is convex and the energy contained therein thus travels out into space and need not be given further consideration.

Upon striking the earth, the plane wave front 86, although traveling at a higher speed than when airborne, remains substantially unchanged in shape. The energy contained in such wave front thus may be considered as beamed along a generally straight path, proceeding until it strikes a submerged reflecting horizon, whereupon it is reflected back to the surface of the earth and recorded by suitable geophone equipment. Since the energy is not dissipated as in using conventional types of explosive charges, reliable soundings may be taken at much greater depths than previously thought possible. In certain tests performed incident to the making of the present invention, reliable echoes were received from horizons at depths of more than 50,000 feet. In spite of such great penetration, the weight of the explosive charges used in such tests was considerably less than normally employed in seismic measurement. The charge disclosed herein is thus ideally suited for use in practicing the multiple reverberation method disclosed in applicant's copending application Ser. No. 794,987, filed December 31, 1947. It has also been found that one explosion suffices for obtaining reflections from a great range of depths, whereas conventional shooting requires that the size of the charge be proportioned to the depth from which a reflection is desired.

In addition to beaming the explosive energy in the form of a plane wave front, the charge assembly 68 may be slightly modified in construction to converge or focus the energy derived from the jet. In accomplishing this the angle A (Fig. 10a) is increased beyond that shown to an angle A' (Fig. 13), the amount of increase being dependent upon the degree of focussing desired. The angle C between the jets is thus similar to that discussed in connection with Figs. 4 and 5. Instead of being plane, the lower wave front 86 under such circumstances assumes the dished or concave contour 86' as set forth in Fig. 13. There are a number of advantages to be derived from the concave wave front. As previously stated, the loss of energy due to fringing or scattering at the periphery of the propagated wave is reduced and the energy existing at the central portion of the beam is kept at a high level. Another advantage is related to the shape of the conical cross section shown in Fig. 12. In this figure the left and right-hand extremities are shown as sharply pointed with the adjacent sides straight throughout their entire length. In a practical case the velocity of the jet 52 will fall off somewhat as it progresses outwardly thereby causing the point to become somewhat blunted. Stated in other words, the reduction in jet velocity tends to cause the outer extremities of the wave front 86 to curl upwardly. The latter, of course, is undesirable since the energy contained in this portion of the wave would be directed away from, instead of toward, the axis of the charge. By causing the wave front 86' as a whole to be made concave the effect of the falling off in jet velocity is effectively compensated and the energy is more completely retained in the beam.

Another advantage of the concave wave front 86', particularly applicable to the preferred embodiment, is that it enables more precise direction of the explosive energy. Thus it will be noted in Fig. 13 that each radial element in the surface 86' proceeds downwardly but angles slightly toward the axis of the charge. Accordingly after striking the submerged horizon 34 a major portion of the energy from the wave front 86' is received within a limited area 88. A geophone placed within the area 88 will therefore produce a reliable response even though the depth of the reflecting horizon 34 is very great.

If desired, the charge assembly 68 may be bodily tilted as shown in Fig. 14 so that the converging wave front is "aimed" at a region 89 which is remote from the location of the charge. Such practice is applicable to both reflection and refraction shooting and is advantageous for a number of reasons. In the first place the geophone is not directly within the blast region of the charge and fewer safeguards need be taken to prevent injury to the instrument. Further, a reading taken at the geophone in region 89 may be used to determine the depth at a region 90 lying generally intermediate the explosive charge and the geophone. Referring again to the applicant's copending application on the Reverberation Method, it will be apparent that the charge assembly may be oriented generally along a selected reverberation path. The particular reverberation corresponding to such path will then be intensified on the geophone record.

Practical field tests have shown that the improved charge and method of use enable reliable sounding to great depths, particularly where the modified charge of Figs. 10, 10a is employed. In order that those practicing the invention may be fully informed, intensive study has been made in order to determine the reasons for the unusual penetrating ability. It will be recalled that the common practice is to drill shot holes varying in depth from thirty to eighty feet or more in order to explode the charge below the loose weathered layer. The reason for this is that setting off of charges above such weathered layer ordinarily causes severe attenuation of the signal. In practicing the present invention, on the other hand, it has been found that even though charges are exploded at or above the surface of the earth, the weathered layer is readily penetrated, and the depth or composition of such layer has very little effect on the geophone record. My observations indicate that this is due to the fact that the procedures disclosed herein inherently make valuable use of certain attenuating properties of granules. Thus, in studying the damping characteristics of earth, sand, and gravel, it has been found that the curve of damping versus the amplitude of the transmitted wave is somewhat bell-shaped, having a flat central portion but dropping off as the amplitude is higher or lower than a certain range of values. In the case of sand the approximate curve is shown at 92 in Fig. 15. It will be noted in this figure that while considerable damping occurs over a wide range of amplitude, only at very low amplitudes or at very high amplitudes does transmission of explosive energy take place efficiently. In the case of gravel the damping curve is of generally similar shape although shifted somewhat to the right as shown at 94. Where the weathered layer includes a wide variety of particle sizes the overall damping is approximately the envelope of the curves 92, 94.

It has been the practice in the past to attempt to increase the amplitude of the transmitted wave and thus penetrate the poorly transmitting layers by brute force. I have observed that increased penetration may be effected by doing just the opposite, namely, by decreasing the amplitude of the wave front applied to the earth to a region lying near the zero axis and designated 95 in Fig. 15. This has not been done by a sacrifice of total energy imparted to the earth for seismic purposes since the increased area acted upon by the flat or concave wave front 86 or 86' is sufficiently great to more than make up for the decrease in the amplitude of the applied wave. In this way it is readily seen that the energy in the wave front is enabled to travel to a great depth without appreciable lessening, while still producing reliable recording intensities at the geophone. Sand or gravel layers at considerable depths are likewise easily penetrated and have very little effect on the received signal.

An additional reason for the penetrating power of the wave front produced by the present invention is considered to be the inherent manner in which the energy is distributed within the cross section of the beam. Referring to Figs. 1, 2, 4, 5, 12, 13 and 14 the wave front is in each instance applied to the ground as an approximate plane. In the case of the disk-type charge generally flat application occurs in both of the horizontal dimensions. However, the foregoing relates to the shape and does not define the amplitude of the wave. The amplitude, on the other hand, has been found to be relatively great in magnitude over a large region surrounding the charge but tapering off to a lower level near the beam periphery. The energy distribution, in general, may be considered more or less bell-shaped and symmetrical about the axis of the charge. There is, therefore, no surface of sharp discontinuity at the periphery of the beam, and accordingly, the sonic loss at such boundary is reduced to a minimum. It must be also borne in mind that the beam area, while large, is sufficiently limited and the concentration of energy, particularly at the center of the beam, sufficiently high that extraneous reflections are minimized. Such extraneous reflections may be due, for example, to receiving impulses from both of the offset portions of a faulted stratum. The procedures disclosed herein are thus to be distinguished from methods of seismic exploration in which charges are exploded high above the earth's surface by means of an airplane or the like and in which the energy level at the surface is so low as to be impracticable.

Still another factor which contributes to the effectiveness of the shock wave is considered to be the nature of the wave, particularly as regards steepness of the wave front and the predominating frequency components. Tests show that the airborne shock wave consists of an initial impulse which is large in magnitude and has an extremely steep wave front followed by a few relatively minor wave impulses. After this wave has been applied to the earth over a large area and reflected from a submerged horizon, the wave received at the geophone is found, in general, to be of higher frequency than waves received by application of conventional techniques. Under field conditions waves were received having a predominating frequency of 100 cycles per second as compared to a frequency of around 33 cycles per second, normally obtained. The advantage residing in the higher frequency is at least two-fold. First of all high frequency waves are apparently accompanied by improved efficiency of transfer of explosive energy to the earth and in improved conduction of such energy by the earth at the energy levels employed herein. Secondly, the higher characteristic frequency enables closely spaced strata to be readily detected on the geophone trace.

With regard to the latter it will be appreciated that conventional geophones are adjusted to an operating condition which is a compromise. If the geophone is adjusted on the one hand for maximum sensitivity, there is little damping and a strong received impulse appears on the geophone tape as a relatively long wave train, the later cycles of which tend to mask the impulses received from closely under-lying strata. On the other hand increasing the damping so that a received impulse dies out after one or two cycles causes a severe reduction in sensitivity. Even when adjusted to some intermediate condition, the geophone cannot give clear indication of closely spaced strata. However, where the predominant frequency is roughly three times normal, as disclosed herein, a received wave impulse may be damped out in one-third the time without sacrifice of sensitivity. It is therefore seen that the present explosive charge and method is suited to overcome inherent disadvantageous characteristics of modern geophones.

Just why the frequency should be higher has also been the subject of investigation. It appears that with the jet unobstructed there is no crushing of surrounding medium as there is in the case of buried charges, for example. Thus the high frequency energy normally dissipated in producing the crushing effect is conserved. Further, since the discharge takes place in an elastic medium (air) and since the energy is applied to the earth's surface only after conversion to a lower amplitude, the high frequency and steep nature of the shock wave front is preserved up to the time of receipt by a geophone. Further, with regard to frequency, tests show that the present charge and method minimize loss of energy through the low frequency vibration of about ten cycles per second known in the art as "ground roll."

Due to the small amount of energy imparted to the earth over each unit area, the present explosive charge and means for employing the same has great practical application in taking soundings over bodies of water. To support the charge the desired distance above the water surface it will be apparent that any desired floating frame or buoy may be employed. During recent years very extensive surveys have been made in coastal waters, and off-shore oil fields are becoming increasingly important. The detonating of explosive charges in the water has the disadvantage that large numbers of fish are killed by the impact. Since such fish are of great commercial value, it is important that they be conserved. It is noteworthy, then, that in the practice of the present invention the amplitude of the shock wave is inherently sufficiently low so as not to harm marine, animal or vegetable life to any observable extent.

The procedures outlined herein are also eminently suited for applications where more conventional setups are completely impracticable. In the course of making measurements of the depth of snow layers in the Antarctic it was found that large charges buried in the snow were practically useless for obtaining good reflections. The reason was apparently two-fold. In the first place the entrapped air in the snow strata formed efficient sonic insulation for high level impulses, and secondly, the snow served as an extremely effective condenser for the hot gases resulting from the explosion. The present explosive and method of applying it is, by contrast, extremely useful for forcing seismic impulses through even snow of low density without substantial lessening.

Where the present method is employed it has been found that the time required for making a setup is reduced to an absolute minimum. It is merely necessary that a support such as a post three to ten feet high be placed in the ground and the charge located thereon. It will be apparent that the charge may be elevated to somewhat greater height where a plane or concave wave front over a larger area is desired. There is no necessity whatsoever for drilling shot holes. This is of particular advantage in certain parts of the country where the desired shot point is difficult of access or where the shot hole must penetrate layers of hard rock as well as one or more layers of sand and gravel. The saving in time is even greater than might be supposed since in employing conventional methods the exploding of one charge frequently causes the shot hole to cave in and necessitates redrilling before another shot may be fired. By way of contrast a large number of charges of a type herein disclosed may be set off in quick succession without damage to the earth, and with only insignificant damage to vegetation. Where the land is owned by others it is frequently necessary to pay large fees for the privilege of seismic shooting, primarily to compensate the owner for damage done by the transporting and installing of heavy drill rigs. Using the charge and method disclosed herein, objections on the part of the landowner are eliminated and any fee reduced to a purely nominal amount.

In cases where a single shot point is employed in conjunction with a number of geophones, several charges may be exploded, each focussed generally in a direction to be picked up by individual ones of the geophones. In this way records may be produced on which the received signal is a maximum and in which there is no danger that the desired signal will be masked by extraneous earth noises and reflections which make the reading of a conventional geophone record a difficult matter. Due to the concentration of explosive energy in a plane or concave wave front much smaller charges may be used than are conventionally employed. Reliable reflections have been obtained using charges as small as ten percent of those previously employed under similar circumstances.

While the drawings have particularly pointed out the applicability of the present charge and method of using it to reflection shooting, it will be apparent to one skilled in the art that the same is equally advantageous in refraction shooting in which the path of the wave front is refracted or bent, traveling below the earth for considerable distances more or less horizontally. Applying the improved charges to refraction shooting, it is merely necessary that the charge be oriented so that the beam or path of propagation of the maximum shock wave energy is angled downwardly and in the direction of the pickup geophones. It has been found that geophones may be located eight miles of the shot point or even at much greater distances without severe attenuation.

Whenever the term reflection occurs in the claims it is hereby defined, and is to be interpreted, generically to include refractions as well. Also, in the following claims, the terms "generally flat," "generally planar" and the like as applied to the wave front will be considered to include, in addition to substantially plane wave fronts, those in which the effective portion thereof consists of a strip or ribbon (such as at 17 in Fig. 1a) and those having surface elements which are converging or focussed.

I claim as my invention:

1. A charge for generating an explosive impulse for use in seismic exploration comprising a flat disk-shaped body, said body having an annular groove of V-shaped cross section extending radially into the outer edge thereof, the lateral surfaces of said body being dished out, and conical shields nesting respectively within said dished out portions in registry therewith and flaring outwardly appreciably beyond the radial confines of said disk thereby to attenuate the direct blast wave emanating from said explosive charge in a direction axially of said charge and serving to concentrate said explosive energy in the radially extending jet emanating from said annular groove and which acts to produce a generally flat shock wave, said conical shields being comprised primarily of inert weighty granular material.

2. The method of seismic exploration which includes the steps of supporting above the surface of the ground a shaped charge having a cavity of V-shaped cross section formed therein with the charge arranged so that the jet emitted from the cavity is unobstructed and proceeds in a direction generally parallel to the surface of the ground for the setting up of a supersonic bow wave, said charge being free of obstruction to the passage of said jet and being supported at such height that the supersonic wave set up by said jet is still of supersonic velocity when it strikes the surface of the ground, exploding said charge to apply said supersonic wave to the surface of the ground in the region generally below the charge to set up a seismic wave in the ground, and then detecting said seismic wave after the same has been reflected from a submerged horizon.

3. The method of seismic exploration which includes the steps of supporting above the surface of the ground a shaped charge having a cavity of V-shaped cross section formed therein with the charge arranged so that the jet emitted from the cavity proceeds in a direction generally parallel to the surface of the earth, said charge being free of obstruction to the passage of said jet and being supported at such height that the supersonic wave set up by said jet is still of supersonic velocity when it strikes the surface of the ground, said charge being angled downwardly toward the ground to a degree equal to the angle between the jet and the supersonic wave resulting therefrom, exploding said charge to apply said supersonic wave to the surface of the ground in the region generally below the charge to set up a seismic wave in the ground, and then detecting said seismic wave after the same has been reflected from a submerged horizon.

4. Seismic apparatus for geophysical prospecting comprising in combination a disk-shaped charge of high explosive having a jet-producing V-shaped groove in the outer edge thereof, said charge being arranged horizontally at such elevation from the ground that the supersonic wave set up by the jet is still of supersonic velocity at the time that it strikes the ground for the setting up of a seismic wave therein in the region below and surrounding the charge, a shielding mass arranged immediately below the charge for blocking off the passage of a supersonic wave directly downward from the charge, and means including geophones for detecting the resulting seismic wave after reflection from a submerged horizon.

5. Seismic apparatus for geophysical prospecting comprising in combination a disk-shaped charge of high explosive having a jet-producing V-shaped groove in the outer edge thereof, said charge being arranged horizontally at such elevation from the ground that the supersonic wave set up by the jet is still of supersonic velocity at the time that it strikes the ground for the setting up of a seismic wave therein in the region below and surrounding the charge, the charge being free of lateral obstruction and the V-shaped groove therein being angled downwardly with respect to the axis of the charge so that the median surface of the groove is in the form of a shallow cone, and means including geophones for detecting the resulting seismic wave after reflection from a submerged horizon.

6. Seismic apparatus for geophysical prospecting comprising in combination a disk-shaped charge of high explosive having a jet-producing V-shaped groove in the outer edge thereof, said charge being free of lateral obstruction and arranged horizontally at such elevation from the ground that the supersonic wave set up by the jet is still of supersonic velocity at the time that it strikes the ground for the setting up of a seismic wave therein in the region below and surrounding the charge, means for firing the charge from the central axis thereof, and means including geophones for detecting the resulting seismic wave after reflection from a submerged horizon.

THOMAS C. POULTER.

References Cited in the file of this patent

UNITED STATES PATENTS

| Number | Name | Date |
|---|---|---|
| Re. 17,242 | McCollum | Mar. 19, 1929 |
| 1,867,098 | Rieber | July 12, 1932 |
| 2,340,314 | Farnham | Feb. 1, 1944 |
| 2,407,093 | Mohaupt | Sept. 3, 1946 |
| 2,409,848 | Greulich | Oct. 22, 1946 |
| 2,415,814 | Davis | Feb. 18, 1947 |
| 2,494,256 | Muskat | Jan. 10, 1950 |
| 2,506,836 | Kaltenberger | May 9, 1950 |
| 2,587,244 | Sweetman | Feb. 26, 1952 |

FOREIGN PATENTS

| Number | Country | Date |
|---|---|---|
| 413,091 | France | Aug. 29, 1910 |
| 28,030 | Great Britain | Dec. 11, 1911 |

OTHER REFERENCES

Russian article by A. A. Tsvetaev, "Applied Geophysics," 1945, No. 1, pages 82–87.

The Explosives Engineer, July-August 1945, pp. 160–163.

Zeitschrift Far Das Gesamte Schiessund Sprengstoffwesen, May 15, 1914, pp. 184–187.

The Explosives Engineer, November-December 1947, pp. 171–173, 182, 183.